United States Patent [19]
Di Matteo et al.

[11] 3,962,588

[45] *June 8, 1976

[54] METHOD FOR MAKING RECORD OF OBJECTS

[76] Inventors: Paul L. Di Matteo, 6 Carol Court, Dix Hills, N.Y. 11746; Joseph A. Ross, 26 Trescott Path, Fort Salonga, N.Y. 11768; Howard K. Stern, 89 Derby Ave., Greenlawn, N.Y. 11740

[*] Notice: The portion of the term of this patent subsequent to Mar. 30, 1992, has been disclaimed.

[22] Filed: June 12, 1975

[21] Appl. No.: 586,144

Related U.S. Application Data

[63] Continuation of Ser. No. 490,875, July 22, 1974, Pat. No. 3,934,469.

[52] U.S. Cl. ................................. 250/558; 356/2
[51] Int. Cl.² ....................................... G01C 11/12
[58] Field of Search ............... 250/558, 199; 356/2, 356/5, 6, 141, 152; 340/25, 29

[56] References Cited
UNITED STATES PATENTS

| | | | |
|---|---|---|---|
| 3,578,863 | 5/1971 | Farrand | 356/5 |
| 3,614,237 | 10/1971 | Kyle et al. | 356/2 |
| 3,663,104 | 5/1972 | Godfrey | 250/558 |
| 3,704,070 | 11/1972 | Johnson et al. | 250/199 |
| 3,799,675 | 3/1974 | Johnson et al. | 356/152 |

*Primary Examiner*—Alfred E. Smith
*Assistant Examiner*—D. C. Nelms
*Attorney, Agent, or Firm*—Watson Leavenworth Kelton & Taggart

[57] ABSTRACT

A method for use in object examination involves the subdivision of a lens field of view into a succession of cells, the encoding of such cell succession and the making of a record of radiant energy reflected into the lens field of view from the object and issuing from the cell succession.

20 Claims, 15 Drawing Figures

METHOD FOR MAKING RECORD OF OBJECTS

This is a continuation, of application Ser. No. 490,875, filed July 22, 1974 now U.S. Pat. No. 3,934,469.

Field of the Invention

This invention relates to apparatus and methods for use in photographic studies of objects.

Background of the Invention

In Fairchild et al. U.S. Pat. No. 1,541,555, a method of photography is disclosed which provides a photograph of an object with a reference pattern superimposed thereon. Prior to making the object photograph, a negative is made of the reference pattern through the lens of a camera. Then, a transparent plate bearing the photographed rendition of the pattern is prepared and placed in the camera in front of unexposed film. The object photograph is then taken, i.e., inclusive of the object and the photograhed rendition of the reference pattern. As set forth in the Fairchild et al. patent, such method provides for correction of certain lens-induced distortion of a photographed object since one can refer to predetermined distortion of the reference pattern by the lens.

Where one might wish to examine an object photographed in the manner set forth in the Fairchild et al. patent, on an incremental basis, by examining renditions of the object in each of the cells or subdivisions of the reference pattern, his task is evidently burdensome where large numbers of cells are involved. Thus, he is required to maintain a continuing incremental correlation between object data and the individual cell of the reference pattern providing such data.

Summary of the Invention

The present invention pertains to improved methods for making records of objects by use of reference patterns to facilitate record examination.

In attaining the foregoing and other objects, the invention provides a method of record making wherein a lens field of view extending from a given location to the object is subdivided into a succession of cells, wherein the cell succession is encoded by disposing discernible elements therein in preselected order and wherein a photograph or the like is made of the object with the encoded cell succession superimposed thereon. In examining a record made from such practice, one can determine the identification of the order of a given cell in a subsuccession of cells directly from the cell subsuccession without need for continuous incremental counting of all cells in the cell succession.

The foregoing and other objects and features of the invention will be evident from the following detailed description of preferred embodiments and practices of the invention and from the drawings thereof.

Description of Preferred Embodiments and Practices

Figure 1:
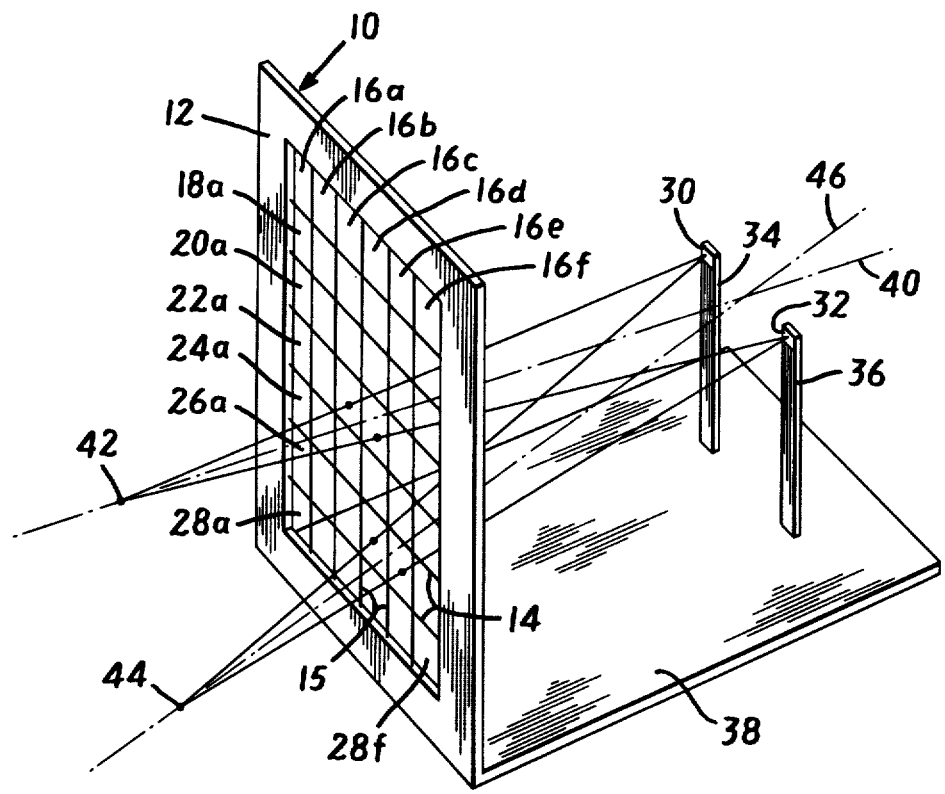
FIG. 1 is a perspective view of one embodiment of apparatus according with copending application Ser. No. 490,875.

Referring to FIG. 1, reticle 10 includes a frame 12 having a transparent central expanse in which are supported lateral and longitudinal grid elements 14 and 15 cooperatively defining a plurality of contiguous separately discernible extents (cells) $16a$ through $28f$ of a field of view. Frame 12 may be of opaque material and grid elements 14 and 15 may comprise relatively thick wires such that they also may be opaque to light or other energy incident on reticle 10. The grid elements may alternatively be substantially transparent devices, for example, fine wire filaments, which are discernible only upon energizaton thereof. In the illustrated embodiment, the cells are of equal extent, having common lateral and longitudinal dimensions, but may be of random extents as discussed below.

Discernible indicia 30 and 32 are provided at the upper portions of support arms 34 and 36, the latter being secured in base 38. Base 38 supports reticle 10 and the indicia in spaced relation for reasons discussed below. The support arms are desirably transparent to radiant energy employed in the discernment of the indicia and the reticle cells.

When indicia 30 and 32 are viewed through reticle 10 along an axis, for example, axis 40, symmetrical to both the reticle and the indicia, the indicia are discernible with different ones of cells $22a$ through $22f$, depending on the viewing location along axis 40. From a given location 42 along axis 40, the indicia are respectively discernible jointly with cells $22c$ and $22d$. Where location 42 is the location of a lens node, a photograph of the reticle and indicia taken with such lens is shown in FIG. 2.

Figure 2:
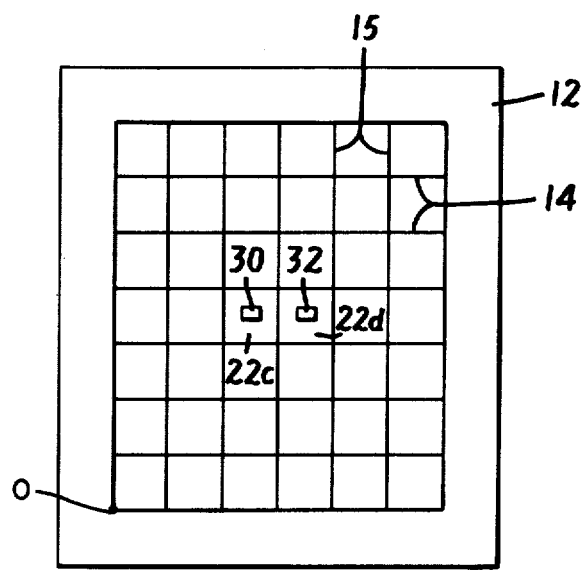
FIG. 2 is a photograph of the apparatus of FIG. 1 taken from a location along an axis symmetrical to the reticle means and the indicia thereof.

Referring to FIG. 2, $x$ and $y$ positional coordinates of each indicium relative to the reticle origin O can be readily defined by observing the number of cells in succession along the $x$ and $y$ axis and determining the order in such successions of the cell jointly discerned with such indicium. Where indicia 30 and 32 are disposed in locations having known positional coordinates, the absolute positional coordinates of the cells of the reticle discernible jointly with the indicia can be readily determined for the positional coordinates of location 42 since the $z$-axis spacing of the indicia relative to the reticle and the reticle geometry are known.

Where the indicia are viewed through the reticle from a location 44 along an axis 46 other than axis 40, and a photograph of such viewing is made (FIG. 3), the reticle cells jointly discernible with the indicia undergo a shift from the aforesaid cells $22c$ and $22d$ to cells $26d$ and $26e$, respectively. Such shifting is attributable to the fact that $z$-axis spacing exists between the reticle and the indicia. The $x$ and $y$ positional coordinates of cells $26d$ and $26e$ being known relative to the positional coordinates of indicia 30 and 32 and the $z$-axis spacing of the indicia and reticle being known, the $x$, $y$ and $z$ positional coordinates of location 44 relative to the reticle structure can be determined by triangulation. As will be appreciated, the reticle may contain a sufficient number of cells for a given application such that interpolation of apparent locations of indicia within a given cell is unnecessary.

While the foregoing discussion has considered a reticle having cells disposed in successions along two axes, the invention may be practiced through the use of a single axis reticle. Thus, in instances where location change is restricted to viewing locations sharing two positional coordinates and departing solely along a "shift" axis in the third positional coordinate, a suitable reticle may comprise a succession of contiguous cells along such an axis parallel to the shift axis and a single indicium supported in spaced relation to the reticle along an axis orthogonal to the shift axis. In use of such single axis reticle, determinations are made of the cell with which the indicium is jointly discernible from locations of interest along the shift axis.

The invention is practiced more suitably than the above-discussed manipulative practice by the generation of electrical signals indicative of the parameters involved. Such signals enable the use of automatic data processing tecniques in solution of the triangulation involved. In such data processing practice, which is not a part of the present invention, digital signals are generated, for example, by suitable card punching, of the invariant parameters, namely, the reticle structure (cell size and arrangement) and the relative positioning of the reticle structure and indicia. Then, information is provided through the present invention concerning the dispositions within the reticle of the cells jointly discerned with the indicia from the unknown location, e.g., cells 22c and 22d for location 42 or cells 26d and 26e for location 44. The latter digital signals may comprise, for each different axial disposition of such as cells 22c and 22d within the reticle, a signal having a plurality of predetermined serial time extents in number corresponding with the number of cells along an axis and a pulse (1) in the one of the time extents for indicating the oder of the cell in the succession. In the illustrative situation, the pulse pattern indicating the y-axis disposition from origin O of both cells 22c and 22d is 0001000. The pulse patterns 001000 and 000100 respectively indicate the x-axis disposition from origin O of cells 22c and 22d.

Figure 3:
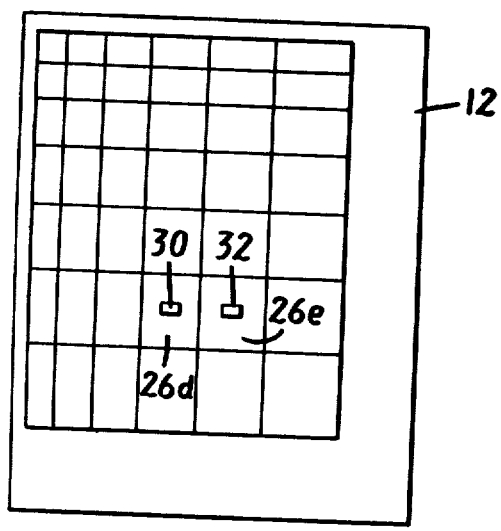
FIG. 3 is a photograph of the apparatus of FIG. 1 taken from a location different from the location referred to in FIG. 2.
Figure 4:
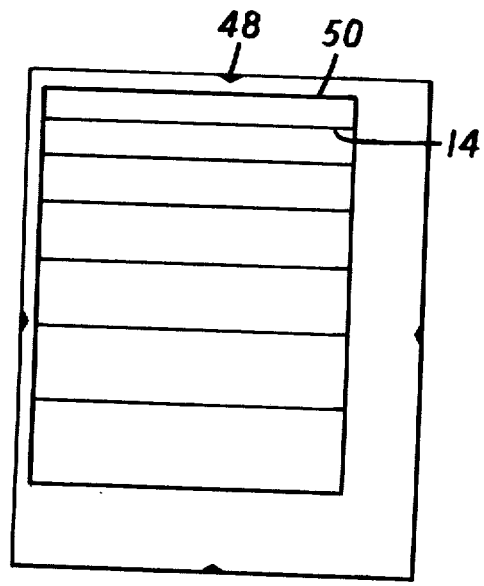
FIGS. 4 through 6 depict photographs each representing a separate part of the composite information contained in the FIG. 3 photograph.
Figure 5:
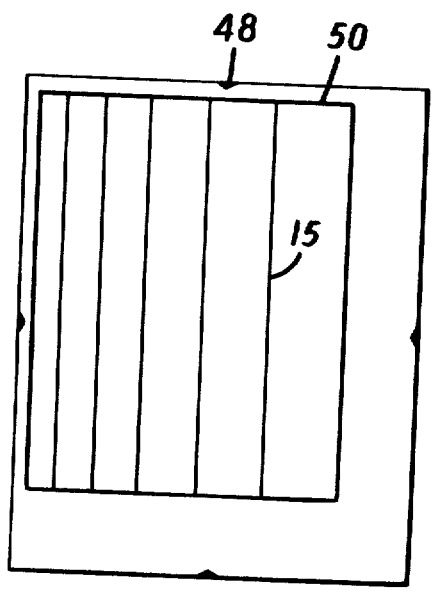
Figure 6:
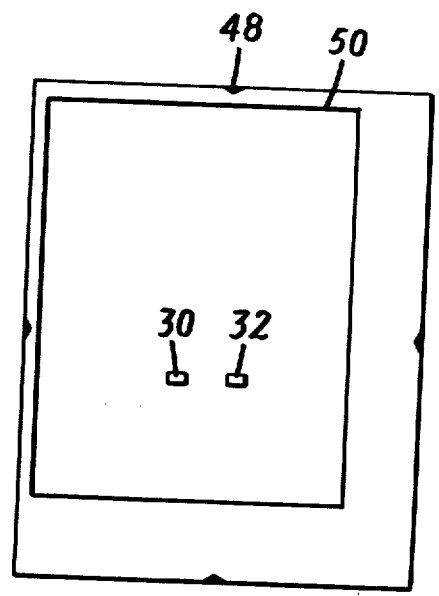

Each of the FIGS. 4–6 depicts a photograph including a selective part of the information content of the FIG. 3 photograph. Thus, FIG. 4 shows the lateral grid elements 14 of FIG. 3, FIG. 5 shows the longitudinal grid elements 15 of FIG. 3 and FIG. 6 depicts indicia 30 and 32 in their FIG. 3 disposition. All of the FIGS. 4–6 photographs include film frame reference marks 48.

The FIGS. 4–6 photographs may be derived, for example, by use of the alternate reticle above-discussed. In deriving the FIG. 4 photograph the indicia and the filaments defining the longitudinal grid elements are deenergized while the filaments defining lateral grid elements are energized. In deriving the FIG. 5 photograph, only the filaments defining the longitudinal grid elements are energized. In deriving the FIG. 6 photograph, the indicia are alone energized.

Figure 7A:
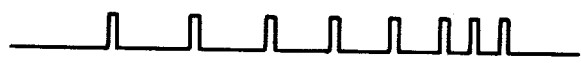
FIGS. 7(a)–(f) show signals generated in accordance with the invention.
Figure 7B:

The FIG. 4 photograph is examined by scanning, e.g., photoelectrically, along an axis transverse to the representations therein of lateral grid elements 14. A pulse is generated as frame border 50 and each of such element 14 representations are encountered in scanning, the pulses being spaced in time in direct proportion to the photographic spacing where the scanner is moved at a uniform rate. The pulses are stored as derived, i.e., with indication of time slots therebetween, as shown in FIG. 7(a). The FIG. 5 photograph is likewise examined by scanning along an axis transverse to the representations therein of longitudinal grid elements 15. The resulting pulse train is shown with its time slot indication in FIG. 7(b).

The FIG. 6 photograph is examined by separate scanning operations in x and y for its indicia representations and signals are generated, each comprising a pulse, derived on indicium representation sensing, and spaced in a scanning time base according with one of the scanning time bases of the signals derived from FIG. 4 and FIG. 5.

Figure 7C:
Figure 7D:
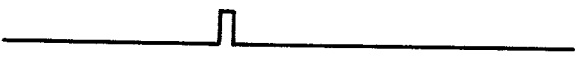
Figure 7E:
Figure 7F:
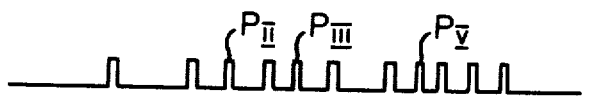

FIG. 7(c) shows the results of x scanning for indicia representations, the pulses therein respectively indicating the x-axis returns for indicia 30 and 32. Taken together, the pulses of FIGS. 7(b) and 7(c) establish the x-axis positional relationship between the indicia and the reticle cells as seen from the viewing location. FIGS. 7(d) and 7(e) show the results of y scanning for indicia representations, the pulses therein respectively indicating the y-axis returns for indicia 30 and 32 to be the same. Taken together, the pulses of FIGS. 7(a), 7(d) and 7(e) establish the y-axis positional relationship between the indicia and the reticle cells as seen from the viewing location. In the example at hand, correlation is found between the indicia 30 x return in FIG. 7(c) and the fourth time slot of the FIG. 7(b) signal and between the indicia 30 y return in FIG. 7(d) and the second time slot of the FIG. 7(a) signal. There being respectively six and seven time slots in the FIG. 7(b) and FIG. 7(a) signals, pulse patterns 000100 (x) and 0100000 (y) may be derived for indicia 30. For indicia 32, the pulse patterns are 000010 (x) and 0100000 (y).

Figure 8:
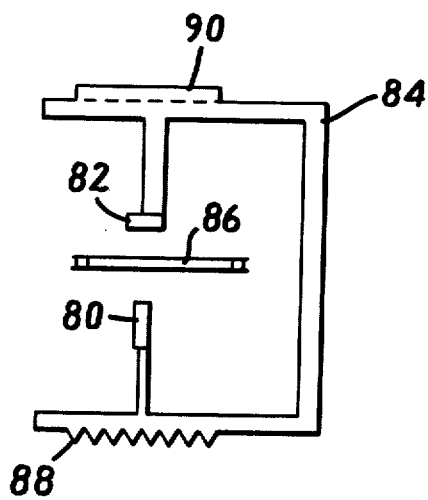
FIGS. 8 through 10 show apparatus for use in practicing the invention.

The apparatus of FIG. 8 may be employed to generate the foregoing signals. A pencil-beam radiant energy source 80 is arranged in fixed alignment with a radiant energy sensor 82 in a scanning mechanism 84. A developed film frame 86 is fixedly positioned intermediate source 80 and sensor 82. The scanning mechanism is moved relative to the film frame through x translational rack 88 and y translational rack 90, each rack being associated with a motor-driven pinion or the like suitably actuated for separate x and y scanning.

Figure 9:
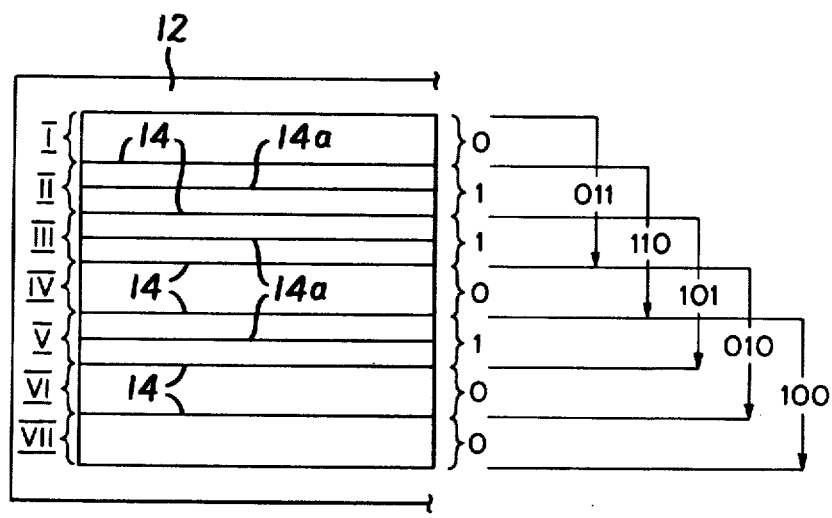

Referring to FIG. 9, a preferred form of reticle structure is shown adapted to avoid need for continuity of incremental counting throughout the cell span involved, and to provide ready determination of errors in cell sensing, e.g., where a longitudinal or lateral grid element is not sensed or is falsely sensed. For simplicity, only lateral grid elements are shown in FIG. 9.

As in the case of the reticle structure of FIG. 1, adjacent (first) lateral grid elements 14 of FIG. 9 define the longitudinal extents of the succession of cells I through VII. In preselected cells, e.g., cells II, III and V, further (second) lateral grid elements 14a are included giving rise to the pattern 0110100 for the cell succession, 0 indicating a cell not containing a second lateral grid element 14a and 1 indicating a cell including such second lateral grid element. In the particularly illustrated embodiment, all grid elements are discernible members, i.e., elements opaque or reflective to radiant energy incident thereon, grid elements 14a constituting means for encoding the reticle structure. Elements 14a are in number less than the number of cells in the succession. As shown to the right in FIG. 9, three bits provide distinct identification of the last five of the seven cells. Cell III has the characteristic identifying code 011, cell IV the code 110, cell V the code 101, cell VI the code 010 and cell VII the code 100.

In the course of cell scanning in use of FIG. 9 reticle, cell-defining signals are derived as above-discussed in connection with FIGS. 4 and 7(a). As shown in FIG. 7 (f), the signals derived include the cell extent-defining pulses of FIG. 7(a) and are further inclusive of cell encoding pulses $P_{II}$, $P_{III}$ and $P_V$ in cells II, III and V. For convencience in discriminating between cell extent-defining pulses and cell encoding pulses, the pulse width or amplitude of the latter may be suitably different than that of the former. The FIG. 7(f) signal may be processed for cell identifying purposes in circuitry providing for successive readout of the three-bit patterns to the right in FIG. 9. As will be evident, provision by such circuitry, e.g., a three-bit register clocked by the cell extent-defining pulses, of the threebit pattern 111, is indicative of an error in cell scanning since this pattern is unassigned.

As will be evident, need for continuous incremental counting of the entire cell span is eliminated where the reticle is encoded as in FIG. 9. Thus, determination of the regular graduation in the assigned code of each detected cell by its three-bit pattern permits one to look to a subsuccession less than the entire cell succession for identification of a given cell. This feature takes on particular significance where the cell succession is large in number, i.e., where continuous incremental cell counting is an onerous task requiring an extended capacity counter. The cell code assignment of FIG. 9 is preferred in practice according with this aspect of the invention. The FIG. 9 reticle structure may be generated by fine wire filaments as discussed above in connection with FIG. 1.

The reticle structure of FIG. 9 involves a progression of first cells having grid elements and second cells, not having grid elements, which progression will be recognized as a shift code. The exemplary seven cell progression follows the code 01100100, such as may be generated by a three-bit shift register shifted cyclically by EXCLUSIVE OR combination of the contents of two stages of the register. The subsuccession of cells which need be considered for cell identification, as referred to above, is coextensive with the number of stages of the shift register generating the code. Stated more generally, where the reticle is shift code encoded and where the total number of first and second cells, in the cell succession is P, each subsuccession of N cells embodies a distinct sequence of first and second cells, the relationship between P and N being established by the formula $2^N - 1 = P$.

Other reticle encoding than shift code encoding may of course be employed, however, with expansion of the subsuccession required to be looked to for identification of a given cell. For example, the reticle structure may be encoded such that the sequence of first and second cells in the cell succession is a pure binary progression. Considering the code generated by a threebit binary counter as being inclusive of successive identifiers 000 and 001, it is apparent that one must look to a cell subsuccession of at least six cells for cell identification, as opposed to the N equal to three situation for an equal P number of cells in using the shift code.

As in the case of the FIG. 1 reticle structure, the FIG. 9 reticle structure, or like encoded reticle structure, may be employed in combination with discernible indicia in the generation of signals for use in determining positional coordinates of a given viewing location. Alternatively, the encoded reticle structure may be employed without such indicia for examining an object in a field of view extending through the encoded reticle structure. By way of example, a developed photograph of the object taken through the encoded reticle structure will evidence encoded cell successions superimposed on the object and providing ready distinction as between different portions of the object.

Figure 10:
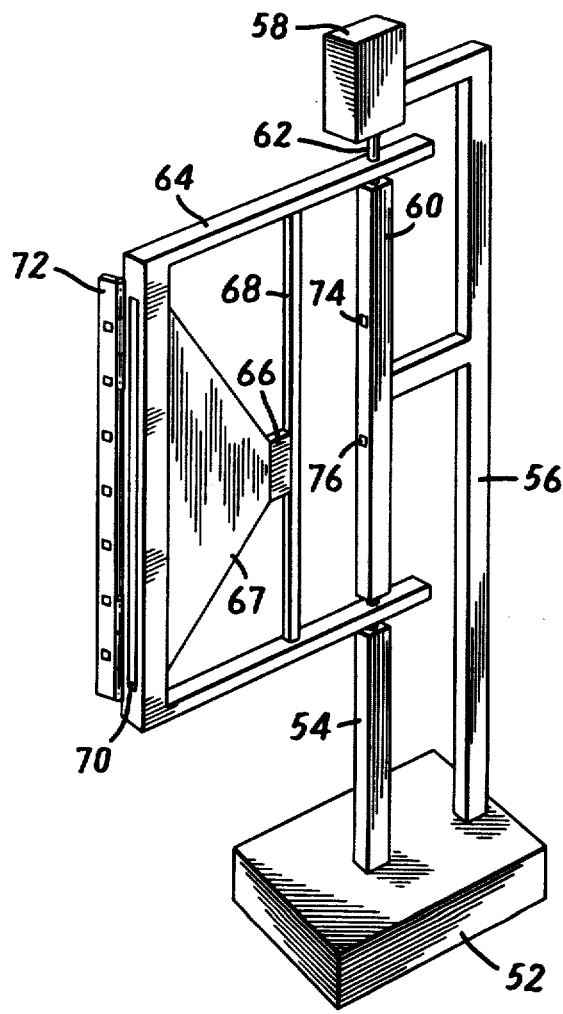

FIG. 10 shows an embodiment of particularly preferred apparatus for use in practicing the invention and especially for providing photographs having selective information content as shown in FIGS. 4–6. Base 52 of FIG. 10 provides a fixed seating for support members 54 and 56. At its upper end member 56 supports a motor 58 and intermediately supports a shaft housing 60. Output shaft 62 of motor 58 is fixedly secured, e.g., by keying, to reticle-defining framework 64, shaft 62 extending through housing 60 and further keyed to framework 64 below the lower extremity of housing 60. The shaft further extends into support member 54, support member 54 and housing 60 incorporating bearings enabling rotative movement of shaft 62 relative thereto.

Reticle framework 64 supports a lamp 66 and a fiber optic assembly 67 on framework strut 68. First ends of the fiber optic assembly are disposed adjacent the lamp and the remaining ends thereof are collected at framework window 70 being arranged such that, upon energization of the lamp with the framework stationary, a continuous vertical line of light is produced at window 70. An apertured window closure member 72 is hingedly connected to framework 64 and is illustrated in its open position. With the framework stationary and member 72 moved onto window 70 into its closed position, there issues from framework 64 a plurality of vertically displaced beams of light. Housing 60 is disposed in z-axis spaced relation to window 70 and supports vertically spaced lamps 74 and 76.

In use of the FIG. 10 apparatus in providing such as the photographs of FIGS. 4–6, member 72 is moved into its closed position and lamp 66 is energized, as is motor 58. As will be evident, framework 64 may be moved in essentially a complete circular path by motor 58 with resulting generation of a cylindrical light pattern defining lateral grid elements such as shown in planar fashion in FIG. 4.

Member 72 is now moved into its closed position and motor 58 is again energized. In the course of movement of framework 64 throughout its circular path, lamp 66 is periodically energized with resulting generation of a cylindrical light pattern defining longitudinal grid elements such as shown in planar fashion in FIG. 5.

With framework 64 now moved into its maximum clockwise or counterclockwise position and motor 58 and lamp 66 deenergized, lamps 74 and 76 are energized to define indicia akin to indicia 30 and 32. Separate photographs are taken of the lateral and longitudinal grid element patterns and of these indicia lamps 74 and 76.

The apparatus of FIG. 10 provides reticle structure which is three-dimensional and serves in use to enclose, partially or fully, a three-dimensional object under study, thus facilitating use of multiple cameras positionally interrelated through the reticle structure. In an exemplary application, multiple cameras may be placed in desired positional relationship with the FIG. 10 apparatus and the foregoing steps of energizing the apparatus may be sequentially practiced, photographs being taken by each of the cameras during each of the steps. The FIG. 10 apparatus is then deenergized and the object is placed in the fields of view of the cameras, and hence within the recorded reticle structure from which the foregoing positional coordinate indicating signals are generated. The object boundary surface is photographically examined by methods such as those discussed in the above-mentioned commonly-assigned patent application. On occurrences of intended camera movements or environmental disturbance causing camera displacement, the three-dimensional reticle may again be generated and examined by the cameras for ready redetermination of the lens node positional coordinates thereof.

Various changes and modifications may be introduced in the apparatus and practices discussed above without departing from the spirit and scope of the invention. By way of example, indicia 30 and 32 may be disposed in spaced relation to reticle frame 12 in the direction of the locations of interest as contrasted with the foregoing illustration in which the indicia are situated on a side of the reticle frame opposite the side thereof facing the locations of interest. The locations of issuance, i.e., the points of first visible propagation, of the light beams generated from window 70 and the light beams generated by lamps 74 and 76 may likewise be in mutually spaced alternating relation relative to the locations of interest. As referred to above, the cells may be of random extents and may be encoded in any desired manner. In discerning such random cells, the signal generation practice discussed in connection with FIGS. 4–8 is particularly effective since time slots are measured and indicate cell extents. In providing the indicia and grid elements with capacity for discernment thereof, they may be light-generating or opaque and reflective to light or, where energy other than light is employed, may be generative of or reflective to such other energy. The invention contemplates practices wherein multiple cameras may be arranged in viewing relation to a common object surface point for improved accuracy and wherein a single camera may successively view an object through reticle structure moved from one location relative to the object to a second different location relative to the object. The foregoing discussion is thus intended in a descriptive and not in a limiting sense. The invention is defined in the following claims.

What is claimed is:

1. A method for use in making a record of an object from a given location comprising the steps of:
    a. establishing a lens field of view extending from said given location to said object;
    b. subdividing said lens field of view into a succession of adjacent separately discernible cells;
    c. encoding said succession of cells by disposing discernible elements within said cells in a preselected sequence, said discernible elements being in number less than the number of said cells and being located between said given location and said object; and
    d. introducing radiant energy in said lens field of view and recording radiant energy in said lens field of view definitive of said object, said succession of cells and said discernible elements, thereby making a record of such encoded cell succession superimposed on said object.

2. The method claimed in claim 1 wherein said cells include first and second cells in total number P in succession along a first axis, said discernible elements being disposed in said first cells and not being disposed in said second cells, each subsuccession of N of said P cells embodying a distinctly ordered arrangement of said first and second cells, wherein the relationship between P and N is $2^N - 1 = P$.

3. The method claimed in claim 2 wherein said step (c) is practiced by disposing said discernible elements in a common plane, said elements being mutually parallel and each having an extent perpendicular to said first axis.

4. The method claimed in claim 3 wherein said elements are made discernible by rendering the same opaque to said radiant energy.

5. The method claimed in claim 3 wherein said elements are made discernible and wherein said radiant energy is introduced in said lens field of view by constituting each of said elements of radiant energy issuing character.

6. The method claimed in claim 1 wherein said cells include first and second cells in succession along a first axis, said discernible elements being disposed in said first cells and not being disposed in said second cells, said preselected sequence being a binary sequence.

7. The method claimed in claim 6 wherein said step (c) is practiced by disposing said discernible elements in a common plane, said elements being mutually parallel and each having an extent perpendicular to said first axis.

8. The method claimed in claim 7 wherein said elements are made discernible by rendering the same opaque to said radiant energy.

9. The method claimed in claim 7 wherein said elements are made discernible and wherein said radiant energy is introduced in said lens field of view by constituting each of said elements of radiant energy issuing character.

10. The method claimed in claim 1 wherein said step (b) is practiced by disposing discernible members each opaque to radiant energy in said lens field of view, wherein in practice of said step (c), said discernible elements are made discernible by rendering the same opaque to radiant energy and wherein said step (d) is practiced by applying radiant energy simultaneously to said discernible members, said discernible elements and said object and recording radiant energy reflected therefrom into said lens field of view.

11. The method claimed in claim 1 wherein said step (b) is practiced by disposing first members in said field of view each energizable to issue radiant energy therefrom, wherein said step (c) is practiced by constituting said discernible elements of second members energizable to issue radiant energy therefrom, and wherein said step (d) is practiced by energizing said first members at a first time and recording radiant energy issuing therefrom in said lens field of view, by energizing said second members at a second time and recording radiant energy issuing therefrom in said lens field of view and by applying radiant energy to said object at a third time and recording radiant energy reflected from said object into said lens field of view.

12. The method claimed in claim 11 wherein said step (d) is further practiced by making separate photographs respectively in said recording of radiant energy issuing from said first members, in said recording of radiant energy issuing from said second members and in said recording of radiant energy reflected from said object.

13. A method for use in making and examining a record of a object from a given location comprising the steps of:
  a. establishing a lens field of view extending from said given location to said object;
  b. disposing a first plurality of discernible elements in said lens field of view for subdivison of said lens field of view into a succession of adjacent cells along a first axis;
  c. encoding said succession of cells by disposing a second plurality of discernible elements within said cells in preselected sequence and in location between said given location and said object, the number of said second discernible elements being less than the number of said cells;
  d. introducing radiant energy in said lens field of view and recording radiant energy in said lens field of view definitive of said object and said first and second pluralities of discernible elements, thereby making a record of such encoded cells superimposed on said object; and
  e. scanning said record along said axis and generating signals spaced in the time base of said scanning and selectively indicative of said first and second discernible elements.

14. The method claimed in claim 13 wherein said discernible elements in said first and second pluralities are of respectively physical different character whereby practice of said step (e) generates first signals indicative of discernible elements in said first plurality, and second signals indicative of discernible elements in said second plurality.

15. The method claimed in claim 14 wherein discernible elements in said first and second pluralities are of respectively different extent along said first axis, whereby practice of said step (e) generates first signals indicative of discernible elements in said first plurality and second signals indicative of discernible elements in said second plurality, said first and second signals being of respectively different time extents.

16. The method claimed in claim 13 wherein the number of said cells is P and the number of said second discernible elements is N and wherein the relationship between P and N is $2^N - 1 = P$.

17. The method claimed in claim 13 wherein said preselected sequence is a binary sequence.

18. The method claimed in claim 13 wherein in practice of said steps (b) and (c) said discernible elements are made discernible by rendering the same opaque to radiant energy and wherein said step (d) is practiced by applying radiant energy simultaneously to said first and second pluralities of said discernible elements and said object and recording radiant energy reflected therefrom into said lens field of view.

19. The method claimed in claim 13 wherein said step (b) is practiced by constituting said first plurality discernible elements of first members energizable to issue radiant energy therefrom, wherein said step (c) is practiced by constituting said second plurality discernible elements of second members energizable to issue radiant energy therefrom and wherein said step (d) is practiced by energizing said first members at a first time and recording radiant energy issuing therefrom in said lens field of view, by energizing said second members at a second time and recording radiant energy issuing therefrom in said lens field of view and by applying radiant energy to said object at a third time and recording radiant energy reflected from said object into said lens field of view.

20. The method claimed in claim 19 wherein said step (d) is further practiced by making separate photographs respectively in said recording of radiant energy issuing from said first members, in said recording of radiant energy issuing from said second members and in said recording of radiant energy reflected from said object.

* * * * *

UNITED STATES PATENT OFFICE
CERTIFICATE OF CORRECTION

Patent No. 3,962,588          Dated June 8, 1976

Inventor(s) Paul L. DiMatteo et al.

It is certified that error appears in the above-identified patent and that said Letters Patent are hereby corrected as shown below:

Title page, Item [*], "Mar. 30, 1992" should read --Feb. 3, 1993--.

Title page, Item [63], "3,934,469" should read --3,936,649--.

Col. 1, l. 6, "3,934,469" should read --3,936,649--.

Col. 3, l. 24, "tecniques" should read --techniques--.

Col. 3, l. 41, "oder" should read --order--.

Col. 4, l. 60, "0" should read --"0"--.

Col. 4, l. 62, "1" should read --"1"--.

Col. 5, l. 6, after "use of" insert --the--.

Col. 5, l. 12, "convencience" should read --convenience--.

Col. 5, l. 20, "threebit" should read --three-bit--.

UNITED STATES PATENT OFFICE
CERTIFICATE OF CORRECTION

Patent No. 3,962,588     Dated June 8, 1976

Inventor(s) Paul L. DiMatteo et al.

It is certified that error appears in the above-identified patent and that said Letters Patent are hereby corrected as shown below:

Col. 5, l. 42, "01100100" should read --0110100--.

Col. 5, l. 61, "threebit" should read --three-bit--.

Col. 9, l. 4, "a object" should read --an object--.

Signed and Sealed this second Day of August 1977

[SEAL]

Attest:

RUTH C. MASON
Attesting Officer

C. MARSHALL DANN
Commissioner of Patents and Trademarks